W. F. RITT.
STUMP CONSUMER.
APPLICATION FILED FEB. 7, 1918.

1,284,778.

Patented Nov. 12, 1918.

Witness
J. F. Britt

Inventor
William F. Ritt
By Geo. W. Young
Attorney

UNITED STATES PATENT OFFICE.

WILLIAM F. RITT, OF MILWAUKEE, WISCONSIN.

STUMP-CONSUMER.

1,284,778.        Specification of Letters Patent.    Patented Nov. 12, 1918.

Application filed February 7, 1918. Serial No. 215,793.

*To all whom it may concern:*

Be it known that I, WILLIAM F. RITT, a citizen of the United States, and resident of Milwaukee, in the county of Milwaukee and State of Wisconsin, have invented certain new and useful Improvements in Stump-Consumers; and I do hereby declare that the following is a full, clear, and exact description thereof.

This invention refers to stump consumers and has primarily for its object to provide a device of this character which when placed over a stump will retain sufficient combustible material and heat to ignite and consume the stump.

Another object is to provide a device of this nature having a slidable top within the same that will compensate for different size stumps and which is adapted to move downward as the stump is consumed, with means for preventing the top from coming in direct contact with the stump thus choking the draft opening.

A further object is to provide a device of this class with a slidable top having means connected thereto which will permit the top to be extended above the shell, when the stump is initially ignited, thus allowing a greater draft through the consumer.

Figure 1:
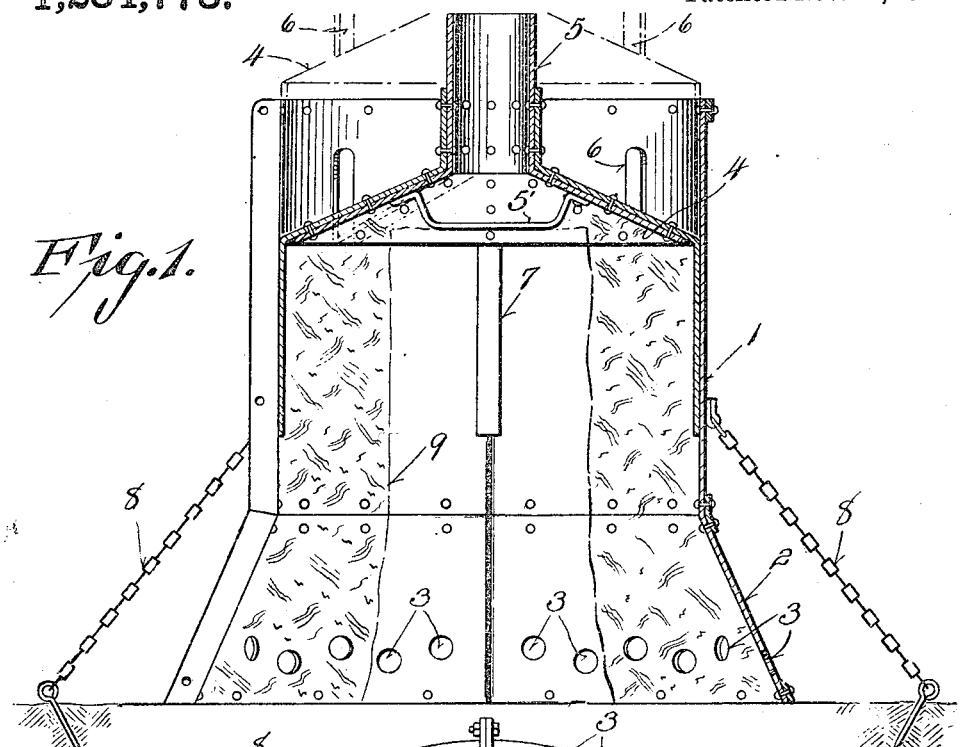
Figure 2:
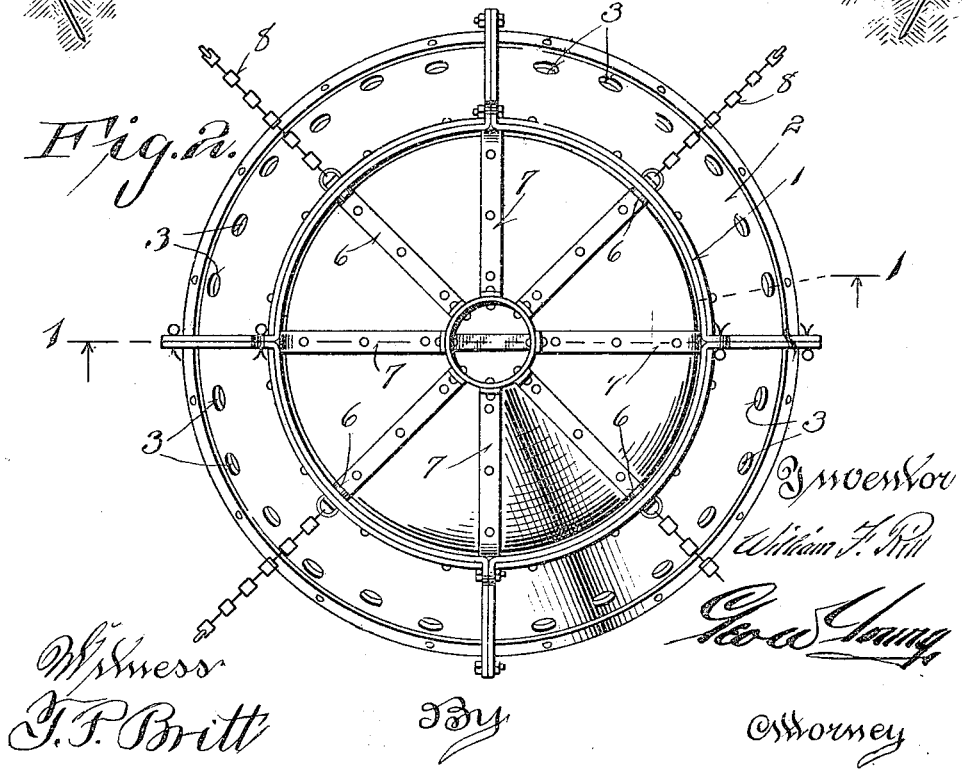

The invention in one practical form in which it may be embodied is illustrated in the accompanying drawing, in which:

Figure 1 is a sectional view taken through the consumer as indicated by the line 1—1 of Fig. 2, and Fig. 2 is a top plan view of the consumer.

In the drawing 1 designates a cylindrical shell having its lower end tapered outwardly at 2 and provided with air inlet passages 3. Slidably mounted within and adapted to fill the opening of the shell is a conical top 4 which has centrally thereof a flue pipe 5. Fastened to the top 4 are guide members 6 and 7 bent upward and downward respectively to engage the sides of the shell 1. Secured to the lower side of the top 4 and straddling the flue opening is an arch strip 5' which upon downward movement of the top will come in contact with the stump and thus prevent the flue opening from being restricted. At suitable intervals about the exterior of the shell are secured anchoring chains 8 which when the shell is placed about a stump are driven into the ground to prevent the shell from tilting or being moved.

In operation the shell 1 is placed over the stump 9, shown by broken lines in Fig. 1, and combustible material of any nature is placed about the stump and retained by the shell 1. The top 4 is then positioned over the shell 1 and the downward turned guide members 7 are inserted in the same. It will be seen that when the shell is filled with wood or other combustible material, the top 4 will remain positioned slightly above the shell, as shown by dotted lines in Fig. 1, thus allowing a greater draft, which is desired upon initially igniting the stump.

Upon downward movement of the top 4 the guide 7 will engage the ground thus limiting its downward movement to the extent of keeping it within the straight portion of the shell. Should the top be allowed to move down into the tapered portion an air space would result around its outer edge which would greatly affect the draft through the flue.

It will be seen that after the stump has been ignited, and due to the consumption of the same it becomes shorter, the slidable top will move downwardly as the consumption takes place thus restricting the heat compartment to the smallest area and increasing the effectiveness and rapidity in which the stump is consumed.

What is claimed is:

1. In a stump consumer a shell adapted to fit about a stump having its lower portion tapered outwardly and provided with air inlet passages, a conical top slidably mounted within the shell, a flue provided in the top, upward and downward turned guides secured to the top, and chains fastened to the shell for anchoring the same against movement.

2. In a stump consumer, a shell adapted to fit about a stump having its lower portion tapered outwardly and provided with air inlets, a conical top slidably mounted within the shell, a flue provided in the top, means secured to the top for preventing obstruction of the flue opening, and guide members secured to the top.

In testimony that I claim the foregoing I have hereunto set my hand at Milwaukee, in the county of Milwaukee, and State of Wisconsin.

WILLIAM F. RITT.

Copies of this patent may be obtained for five cents each, by addressing the "Commissioner of Patents, Washington, D. C."